Feb. 28, 1961 R. L. VAN ANTWERP 2,973,207

RECORD CHANGER AND CABINET THEREFOR

Filed Dec. 24, 1956

INVENTOR.
ROBERT L. VAN ANTWERP,
BY
Lockwood, Galt, Woodard & Smith.
ATTORNEYS.

2,973,207
Patented Feb. 28, 1961

1

2,973,207

RECORD CHANGER AND CABINET THEREFOR

Robert L. Van Antwerp, Benton Harbor, Mich., assignor to V-M Corporation, Benton Harbor, Mich.

Filed Dec. 24, 1956, Ser. No. 630,138

2 Claims. (Cl. 274—2)

This invention relates generally to record changing apparatus and their enclosing cabinets and in particular to the arrangement of the exterior components of a portable record changer.

In modern portable record changing phonographs, because of the requirement that over-all size be retained to a minimum, it has become necessary to house certain of the components, such as the speaker enclosure, in the lid or top cover of the phonograph. If the speaker enclosure is mounted in the lid opposite the turntable, the result is that with the lid in closed position, the turntable area is obstructed by the speaker enclosure. Since the conventional record support arm is normally situated in the turntable area, some means must be provided for assuring that the record support arm is moved out of the turntable area, and therefore not contacted by the speaker enclosure as the lid is closed.

An object of the present invention is to provide a compact record changing phonograph in which the record support arm is automatically moved out of the turntable area as the lid or cover of the phonograph is closed, and in which the record support arm automatically returns to its position over the turntable as the lid or cover is opened.

A further object is to proivde a compact portable record changing phonograph in which the speaker enclosure is carried by the lid in juxtaposition to the turntable and in which a cam member mounted within the lid serves to swing the record supporting arm out of obstructing relation with the speaker enclosure as the lid is closed.

A further object is to provide a particularly compact arrangement of components for a portable record changing phonograph in which closure of the phonograph lid assures that the movable components are in their proper standby positions.

The full nature of the invention will be understood from the accompanying drawings and the following description and claims:

Figure 1:
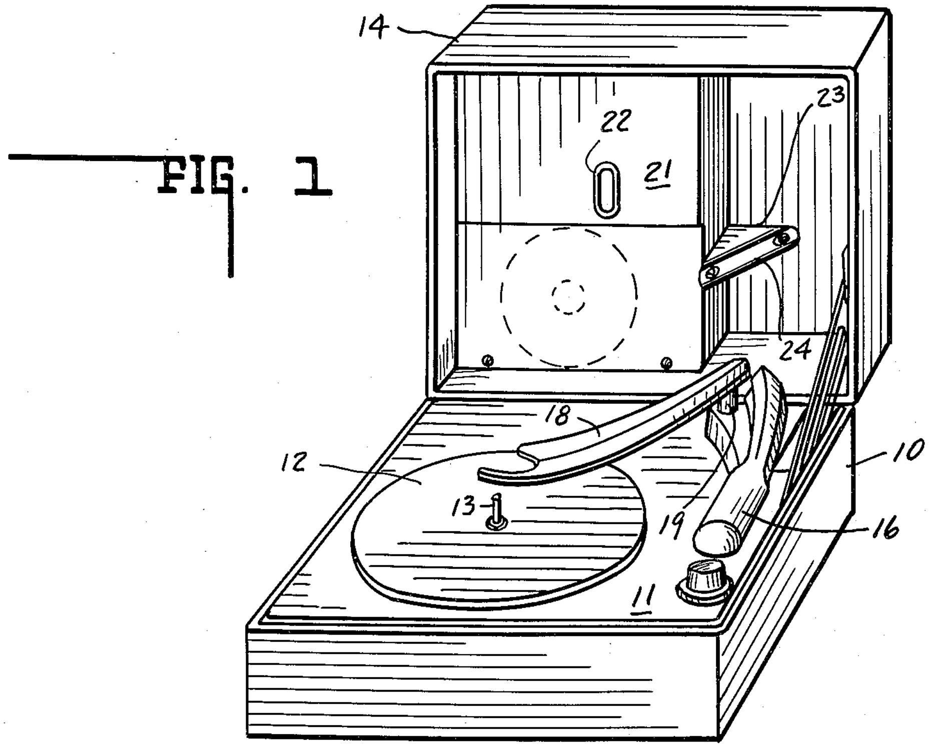
Fig. 1 is a perspective view of a phonograph embodying the present invention.

Referring initially to Fig. 1 there is shown at 10 a base member or cabinet housing which has a base plate 11 having mounted thereon a conventional phonograph turntable 12. A spindle mounting member 13 extends from the turntable and is adapted to receive by threaded engagement a record supporting spindle (not shown) of conventional type. As shown, the spindle has been removed and stowed by means of a suitable clamp (not shown) within the lid or cover member 14. A conventional tone arm 16 is pivotally supported at 17 (Fig. 2) on the base plate 11 and a record supporting arm 18 is also pivotally supported at 19 on the base plate 11. It will be understood that arm 18 is conventionally spring biased to a position in which its outer extremity overlies the central portion of the turntable 12, the position shown in Fig. 1.

Figure 2:
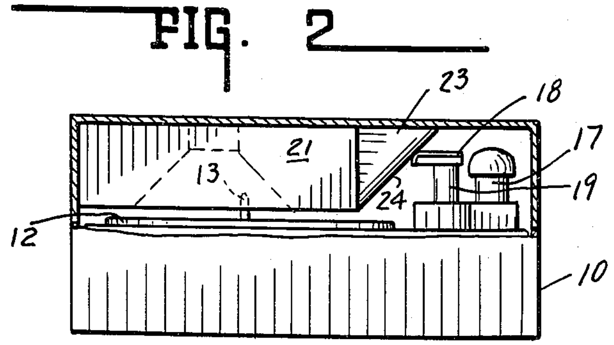
Fig. 2 is a front view of the phonograph with the lid closed and a portion of the lid broken away.

Lid 14 has a convenional hinged connection with the cabinet 10 and has mounted within it a speaker enclosure 21 so positioned that when the lid is in closed position, as shown in Fig. 2, the speaker enclosure is in juxtaposition with or opposite to the turntable 12. A recess or opening 22 in the speaker enclosure accommodates the spindle mounting member 13 when the lid is closed. Mounted within the lid 14 adjacent the speaker enclosure 21 is a camming member 23 having an inclined surface 24 adapted to cooperate with the shank portion of the arm 18 as the lid is closed.

Figure 3:
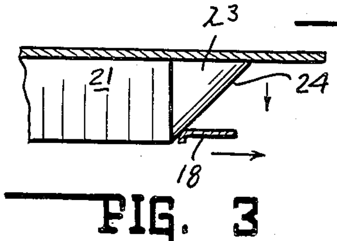
Fig. 3 is a fragmentary view of the lid and record supporting arm in the positions they assume as the lid approaches its closed position.
Figure 4:
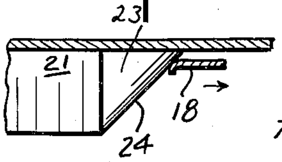
Fig. 4 is a view similar to Fig. 3 but showing the positions of the parts as the lid reaches its closed position.

It will be understood that, in the absence of cam member 23, closure of the lid 14 would be obstructed by the presence of the arm 18 in the turntable area. As may best be seen in Figs. 3 and 4, as the lid 14 approaches its closed position, the lower area of the inclined surface 24 on the member 23 contacts the inner edge of the arm 18. The final closing movement of the cover displaces the arm 18, against its spring bias, laterally out of the turntable area and into a position in which it is generally coextensive with the tone arm 18 and does not obstruct closure of the lid 14. It will be apparent that the coaction of camming member 23 and arm 18 obviates the necessity of providing additional depth for the lid 14 over the turntable 12 to accommodate the arm 18 and that the space within the lid adjacent the speaker enclosure 21 can thereby be used to maximum advantage in housing both the tone arm 16 and the record support arm 18.

It will be understood that the invention herein described may be modified over that disclosed; the invention is to be limited only as defined in the following claims.

The invention claimed is:

1. A compact, portable record changing phonograph having a cabinet and a phonograph base plate mounted therein, a record support arm pivotally mounted on the base plate, a turntable also mounted on said base plate having a spindle extending therefrom, a lid hinged to the cabinet for enclosing the cabinet when moved to its closed position, said support arm being adjustable to a position in the way of a portion of said lid in the closed position of said lid, and means for assuring that said record support arm is positioned out of the way of said lid portion when the lid is in closed position comprising a camming member mounted within said lid and engageable with said support arm to pivotally displace said support arm to a position out of the way of said lid portion as the lid moves to its closed position.

2. A compact, portable record changing phonograph having a cabinet and a phonograph base plate mounted therein, a record support arm pivotally mounted on the base plate, a turntable also mounted on said base plate having a spindle mounting member extending therefrom, a lid hinged to the cabinet for enclosing the cabinet when moved to its closed position, a speaker enclosure carried by said lid in juxtaposition to said turntable, said enclosure being provided with a recess therein to accommodate said spindle mounting member when the lid is in closed position, said support arm being adjustable to a position in the way of said enclosure in the closed position of said lid, and means for assuring that said record support arm is positioned out of the way of said enclosure when the lid is in closed position comprising a camming member mounted within said lid adjacent said enclosure and having an inclined surface engageable with said support arm to pivotally displace said support arm to a position out of the way of said enclosure as the lid moves to its closed position.

References Cited in the file of this patent

UNITED STATES PATENTS

| | | |
|---|---|---|
| 1,783,836 | Finlayson | Dec. 2, 1930 |
| 2,532,405 | Jakeway | Dec. 5, 1950 |
| 2,552,757 | Adler et al. | May 15, 1951 |
| 2,652,257 | Mullaney | Sept. 15, 1953 |
| 2,777,902 | Goldmark | Jan. 15, 1957 |